US009992400B2

(12) United States Patent
Burtey et al.

(10) Patent No.: US 9,992,400 B2
(45) Date of Patent: Jun. 5, 2018

(54) REAL-TIME CHANGES TO A SPHERICAL FIELD OF VIEW

(71) Applicant: VideoStitch Inc., San Francisco, CA (US)

(72) Inventors: Nicolas Burtey, Mountian View, CA (US); Stéphane Valente, Paris (FR); Alexander Fink, San Jose, CA (US)

(73) Assignee: VIDEOSTITCH INC., San Francisco, CA (US)

( * ) Notice: Subject to any disclaimer, the term of this patent is extended or adjusted under 35 U.S.C. 154(b) by 297 days.

(21) Appl. No.: 15/050,918

(22) Filed: Feb. 23, 2016

(65) Prior Publication Data

US 2017/0244884 A1 Aug. 24, 2017

(51) Int. Cl.
*H04N 7/00* (2011.01)
*H04N 5/232* (2006.01)
*H04N 5/265* (2006.01)
*G02B 27/01* (2006.01)
*H04N 5/235* (2006.01)

(52) U.S. Cl.
CPC ..... *H04N 5/23203* (2013.01); *G02B 27/0101* (2013.01); *G02B 27/0172* (2013.01); *H04N 5/2353* (2013.01); *H04N 5/23238* (2013.01); *H04N 5/265* (2013.01); *G02B 2027/011* (2013.01); *G02B 2027/0187* (2013.01)

(58) Field of Classification Search
None
See application file for complete search history.

(56) References Cited

U.S. PATENT DOCUMENTS

2004/0247173 A1* 12/2004 Nielsen ............... G06T 3/0062
382/154
2017/0171442 A1* 6/2017 Spielberg ............... H04N 5/232

OTHER PUBLICATIONS

Szeliski, Richard, "Image Alignment and Stitching: A Tutorial", Dec. 10, 2006, Microsoft Research, Redmond, WA, pp. 1-89.
NerdStash, "Roto VR: The Counterpart to Virtual Reality", http://thenerdstash.com/roto-vr-counterprat-virtual-realty, Mar. 27, 2015, 2 pages.
Szeliski, Richard, "Image Alignment and Stitching: A Tutorial", Dec. 10, 2006, Microsoft Research, Redmond, WA, pp. 1-87.

* cited by examiner

*Primary Examiner* — Dakshesh D Parikh
(74) *Attorney, Agent, or Firm* — Christopher P. Maiorana, PC

(57) ABSTRACT

A system includes a video source and a computing device. The video source may be configured to generate a plurality of video streams that capture a view of an environment. The computing device generally includes one or more processors configured to (i) perform a stitching operation on the plurality of video streams to generate a video signal representative of a spherical field of view of the environment, (ii) transmit a display signal that represents a projection of the video signal to be displayed to a user utilizing an immersive display, (iii) receive a plurality of commands from the user while the user observes the environment in the immersive display and (iv) adjust a plurality of parameters in one or more of the video source and the stitching operation in real time in response to the commands.

20 Claims, 14 Drawing Sheets

REAL-TIME CHANGES TO A SPHERICAL FIELD OF VIEW

This application relates to co-pending U.S. application Ser. No. 14/982,191, filed Dec. 29, 2015, and Ser. No. 14/982,236, filed Dec. 29, 2015, which are incorporated by reference in their entirety.

FIELD OF THE INVENTION

The invention relates to video authoring generally and, more particularly, to a method and/or apparatus for implementing real-time changes to a spherical field of view.

BACKGROUND

When a person films a scene with a conventional digital video camera, the person can change camera settings based on what is seen through a display of the camera. What the person sees on the display and the video being captured by the camera have the same geometry. With an omnidirectional video camera that captures a spherical scene, changing the camera settings is more complex. An equirectangular projection is often used to show the spherical scene on a rectangular display, similar to how the Earth is projected onto a flat map. The equirectangular projection distorts the spherical scene and the distortion commonly hides issues with the omnidirectional video camera settings.

It would be desirable to implement real-time changes to a spherical field of view.

SUMMARY

The invention concerns a system having a video source and a computing device. The video source may be configured to generate a plurality of video streams that capture a view of an environment. The computing device generally includes one or more processors configured to (i) perform a stitching operation on the plurality of video streams to generate a video signal representative of a spherical field of view of the environment, (ii) transmit a display signal that represents a projection of the video signal to be displayed to a user utilizing an immersive display, (iii) receive a plurality of commands from the user while the user observes the environment in the immersive display and (iv) adjust a plurality of parameters in one or more of the video source and the stitching operation in real time in response to the commands.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the invention include providing real-time changes to a spherical field of view that may (i) provide a better perspective of a spherical scene than a flat display, (ii) allow a user to be immersed in the spherical scene while authoring a video, (iii) allow a spherical video authored by the user to be shared with multiple displays, (iv) provide real time adjustments of camera/source parameters, (v) provide real time adjustments of stitching parameters and/or (vi) be implemented as one or more integrated circuits.

An omnidirectional video camera generally provides coverage for multiple areas of a spherical field of view (or a spherical scene) using multiple capture devices pointed in different directions. Encoded video streams representative of the respective areas may be generated and presented for processing. A stitching technique generally performs a video stitching operation that combines the individual encoded video streams into a single video stream representative of the spherical field of view. Sensors may sense a direction (or position) in the spherical field of view where the user is looking. Based on the direction, a portion (or projection) of the video signal may be projected into one or two (e.g., stereo) views in one or two display video signals.

The display video signals may be displayed in a display (e.g., an immersive helmet, a head-mounted display or a computer screen) to the user while the user is wearing (or utilizing) the display. The display (or immersive display) generally gives the user an impression of being immersed in the environment surrounding the omnidirectional camera. The immersion may create a level of consciousness where the user has a sense of being in and surrounded by the environment. Sensors may respond to commands (or instructions) issued by the user to initiate real-time changes to the parameters (or settings) of the camera and/or the parameters (or settings) of the video stitching operation. The commands generally enable the user to author real-time changes in the video signal being viewed and optionally being recorded for subsequent editing and/or display.

Figure 1:
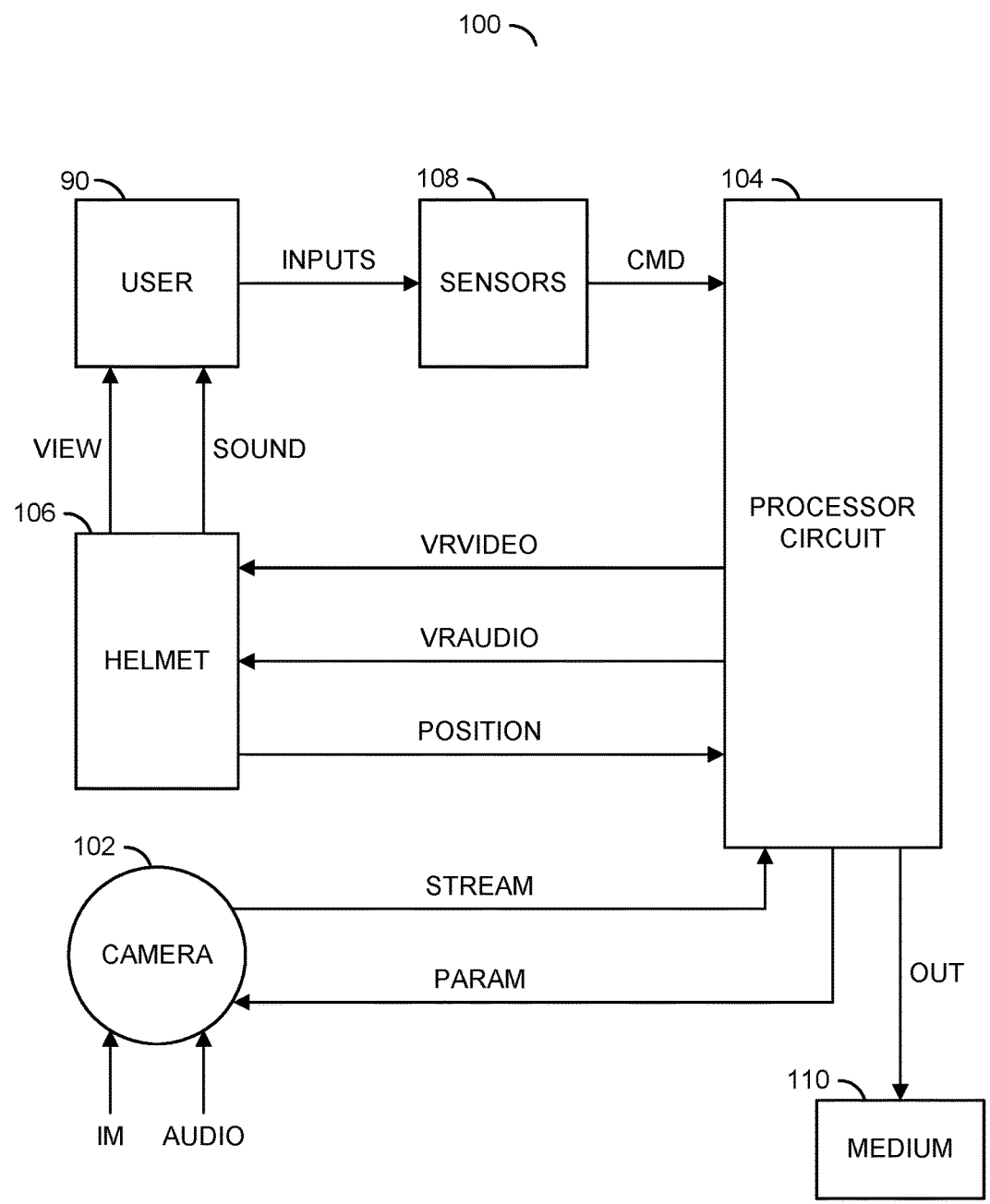
FIG. 1 is a block diagram of a system in accordance with an embodiment of the invention.

Referring to FIG. 1, a block diagram of a system 100 is shown in accordance with an embodiment of the invention. The system (or apparatus or machine) generally comprises a block (or circuit) 102, a block (or circuit) 104, a display (or helmet) 106, a block (or circuit) 108 and a block (or circuit) 110. A user 90 may interact with the system.

Scenes from an environment surrounding the circuit 102 may be captured (e.g., digitized) by the circuit 102 in the form of a signal (e.g., IM). The signal IM may represent light received at the circuit 102 from multiple directions. Audio from the environment may be captured (e.g., digitized) by the circuit 102 in the form of a signal (e.g., AUDIO). The signal AUDIO may represent sound received at the circuit 102 from one or multiple directions. A signal (e.g., STREAM) may be generated by the circuit 102 and transferred to the circuit 104. The signal STREAM generally comprises multiple encoded video streams with visual content and, optionally, audio content. A signal (e.g., PARAM) may be generated by the circuit 104 and transferred to the circuit 102. The signal PARAM generally comprises multiple adjustable (or programmable) parameters of the circuit 102.

A signal (e.g., VRVIDEO) may be generated by the circuit 104 and received by the helmet 106. The signal VRVIDEO may be a display signal that conveys the visual content to be shown to the user 90. A signal (e.g., VRAUDIO) may be generated by the circuit 104 and received by the helmet 106. The signal VRAUDIO may by an audio signal that conveys audio content to be played to the user 90. In some embodiments, the video content and the audio content may be presented together in the signal VRVIDEO. A signal (e.g., POSITION) may be generated by the helmet 106 and transferred to the circuit 104. The signal POSITION may convey a position (or direction) in the spherical field of view that the user 90 is observing. A signal (e.g., OUT) may be generated by the circuit 104 and transferred to the circuit 110. The signal OUT may convey encoded video containing the stitched video streams and is representative of the spherical field of view and the audio content.

The helmet 106 may generate an optical signal (e.g., VIEW) shown to the user 90. The signal VIEW may represent the visual content in the signal VRVIDEO. An audio signal (e.g., SOUND) may be played by the helmet 106 to the user 90. The signal SOUND may represent the audio content in the signal VRAUDIO. A signal (e.g., INPUTS) may be received by the circuit 108 from the user 90. The signal INPUTS generally comprises one or more physical and/or audible input commands issued by the user 90 to control the system 100. A signal (e.g., CMD) may be generated by the circuit 108 and transferred to the circuit 104. The signal CMD may be an electrical signal that conveys information representative of the input commands.

The circuit 102 may implement an omnidirectional camera (or live video source). In various embodiments, the camera 102 generally comprises multiple capture devices (e.g., lenses, apertures, and optical sensors). In some embodiments, one or more of the capture devices may include one or more audio sensors. The capture devices may be arranged to provide coverage for some to all of a spherical field of view of the environment surrounding the camera 102. The camera 102 may include mechanical connections to mount on a tripod. Additional details of an example implementation of the camera 102 may be found in co-pending U.S. application Ser. No. 14/982,191, filed Dec. 29, 2015, which is hereby incorporated by reference in its entirety.

The circuit 104 may implement a processor circuit. The circuit 104 is generally operational to perform the stitching operation on the video streams in the signal STREAM to generate the video signal VRVIDEO. The signal VRVIDEO may be representative of the visual environment. The stitching operation may also generate the signal VRAUDIO. The signal VRAUDIO may be representative of the audio environment. The circuit 104 may also be operational to transmit the visual content in the signal VRVIDEO and, optionally, the audio content in the signal VRAUDIO. The visual content in the signal VRVIDEO may represent a projection of the spherical field of view to be displayed to the user 90 wearing the helmet 106. Along a feedback path through the circuit 108, the circuit 104 may receive multiple commands from the user 90 while the user 90 observes and/or hears the environment in the helmet 106. In response to the commands in the signal CMD and position information in the signal POSITION, the circuit 104 may adjust in real time (e.g., the time during which the environment is digitized, stitched, projected and displayed) one or more camera parameters in the camera 102 and/or one or more stitching parameters in the stitching operation. In various embodiments, the circuit 104 may be implemented in hardware-only circuitry or in a computer program executing on hardware.

An example tutorial of how to perform the stitching operation may be found in "Image Alignment and Stitching: A Tutorial", Technical Report MSR-TR-2004-02, by Richard Szeliski, Microsoft Corporation, Redmond, Wash., which is hereby incorporated by reference in its entirety. An example implementation of the stitching operation may be the Vahana VR software package, available from VideoStitch, Inc., Sunnyvale, Calif. Other stitching operation designs may be implemented to meet the criteria of a particular application.

The helmet 106 may implement an immersive helmet. The helmet 106 may be operational to give the user 90 an impression of being immersed in the environment surrounding the camera 102. The helmet 106 generally converts the visual content received in the signal VRVIDEO into the optical signal VIEW. In various embodiments, the signal VIEW may be monoscopic and/or stereoscopic. The helmet 106 may also convert the audio content received in the signal VRAUDIO into the signal SOUND. In different embodiments, the signal SOUND may be monophonic, stereophonic, quadrophonic, binaural (related to two ears), multichannel and/or three-dimensional sound fields.

A position in the spherical field of view that the user 90 is observing may be sensed by the helmet 106 and/or by accompanying sensors external to the helmet (or display). The position information may be transferred in the signal POSITION to the circuit 104. The position information may include a spatial head orientation (e.g., pitch, roll and yaw) of the user 90 and/or an eye position indicating a direction of the eyes of the user 90. In some embodiments, the position information may be determined by the user 90 moving the view in the signal VIEW around in the spherical field of view by issuing commands to the sensors 108 and/or circuitry of the helmet 106. In various embodiments, the position information may be determined by detecting an orientation of the helmet 106 using orientation sensors (e.g., gyroscopes, accelerometers, gravitometers, compasses or a combination thereof). The helmet 106 may be implemented as a virtual reality helmet, a head-mounted display, a computer display, a multi-sensory mask, a first-person helmet, a cell phone, a tablet, and the like.

The circuit 108 may implement one or more sensors. The sensors 108 may be operational to translate physical commands and/or acoustic commands received from the user 90 into electrical commands. The sensors 108 may include, but are not limited to, a speech recognition circuit, an eye tracking sensor, a hand gesture sensor, one or more angle sensors in a rotating platform (e.g., rotating chair), a game pad sensor, a tracking pad sensor, and a computer mouse. The electrical commands may be transferred to the circuit 104 in the signal CMD.

The circuit 110 may implement a medium circuit. The medium 110 generally comprises one or more memory circuits and/or one or more transmission media capable of storing and/or transmitting the stitched video. In some embodiments, the memory-type medium 110 may comprise a single memory circuit. In various embodiments, the memory-type medium 110 may be implemented as multiple memory circuits. The transmitting-type medium 110 may be implemented as a wired, wireless and/or optical medium (or network). For example, the wired transmission medium 110 may be implemented as an Ethernet network. A wireless transmission medium 110 may be implemented as a wireless Ethernet network and/or a wi-fi network. An optical transmission medium 110 may be implemented as an optical Serial Digital Interface video channel. Other types of media may be implemented to meet the design criteria of a particular application.

Consider an example scenario where the camera 102 is located on a boat dock with the sun low in the sky and the user 90 is wearing the helmet 106. While looking across the dock toward the sun in the spherical field of view, the user 90 may wish to change an aperture setting in the camera 102 because the sun-facing portion of the spherical field of view is too bright. The helmet 106 may report in the signal POSITION the too-bright portion of the spherical field of view that the user 90 is observing. The user 90 may issue a reduce-aperture command using speech and/or hand motions. The speech and/or hand motions may be sensed by the sensors 108 and reported in the signal CMD.

In response to the reduce-aperture command, the circuit 104 may determine that the user 90 wants to change a camera parameter. The circuit 104 may identify which capture device (e.g., lens and optical sensors) is contributing to the too-bright portion of the spherical view based on the signal POSITION. An updated parameter (or an instruction to update the parameters) for the identified capture device may be issued by the circuit 104 in the signal PARAM. The camera 102 generally reduces the aperture of the identified capture device based on the signal PARAM.

The user 90 may see the too-bright portion of the spherical field of view darken in real time (or near-real time) in response to the reduce-aperture command. The apertures of the other capture devices in the camera 102 may be unaffected by the parameter change in the identified capture device. As such, only the brightness in the too-bright portion of the spherical field of view, and possibly the immediately surrounding areas due to blending, may change. If the user 90 turns around 180 degrees to face away from the sun, the capture device facing away from the sun may still have a normal aperture setting so the user 90 would see a normal exposure in that part of the video sphere.

In some situations, the user 90 may be looking at a portion of the spherical field of view that is midway between two capture devices. Any adjustment to reduce the brightness of the midway portion would command both apertures of both capture devices contributing to the midway portion to darken. The camera parameters of the remaining capture devices generally remain unchanged.

In another example scenario, the camera 102 may be located on the boat dock and the user 90 is looking at an object seen simultaneously by two or more capture devices. The capture devices generally do not have a common optical center. If the object is not at a stitching plane distance, the object may be projected at two or more different locations in the spherical field of view, a different location for each of the two or more capture devices. The two or more locations generally result in parallax effects and stitching artifacts. To minimize the stitching artifacts, the user 90 may issue a command to change the stitching distance. The sensors 108 may relay the command to the circuit 104 via the signal CMD. The circuit 104 generally examines the command and determines that the command is related to the stitching operation but not related to the camera parameters. The circuit 104 may respond to the command by changing the stitching distance in the stitching operation. The user 90 generally sees the results in real time, or in near-real time.

The video stitching operation may combine calibration parameters that characterizes intrinsic and extrinsic camera parameters. The intrinsic camera parameters generally represent optical characteristics of each capture device in the camera 102. The optical characteristics may include, but are not limited to, field of view, optical center, lens distortions, light sensitivity and focal length. The extrinsic camera parameters generally represent physical locations and spatial orientations of the capture devices. The extrinsic camera parameters may be characterized how the capture devices relate to each other when scenes are acquired.

Multiple input pictures in the encoded video streams captured by the capture devices may be considered multiple planes (or pictures) at some distance. Through projection equations (or transformations) in the stitching operation, the planes may be projected onto a common sphere. An initial projection from the encoded video streams to the single video stream may be, but is not limited to, an equirectangular projection or a cubic projection. Because the view points of the various capture devices may cover overlapping regions of the surrounding environment, the projected planes usually overlap with each other once projected onto the common sphere. Blending operations in the stitching operation generally stitch the various projected planes together.

Figure 2:
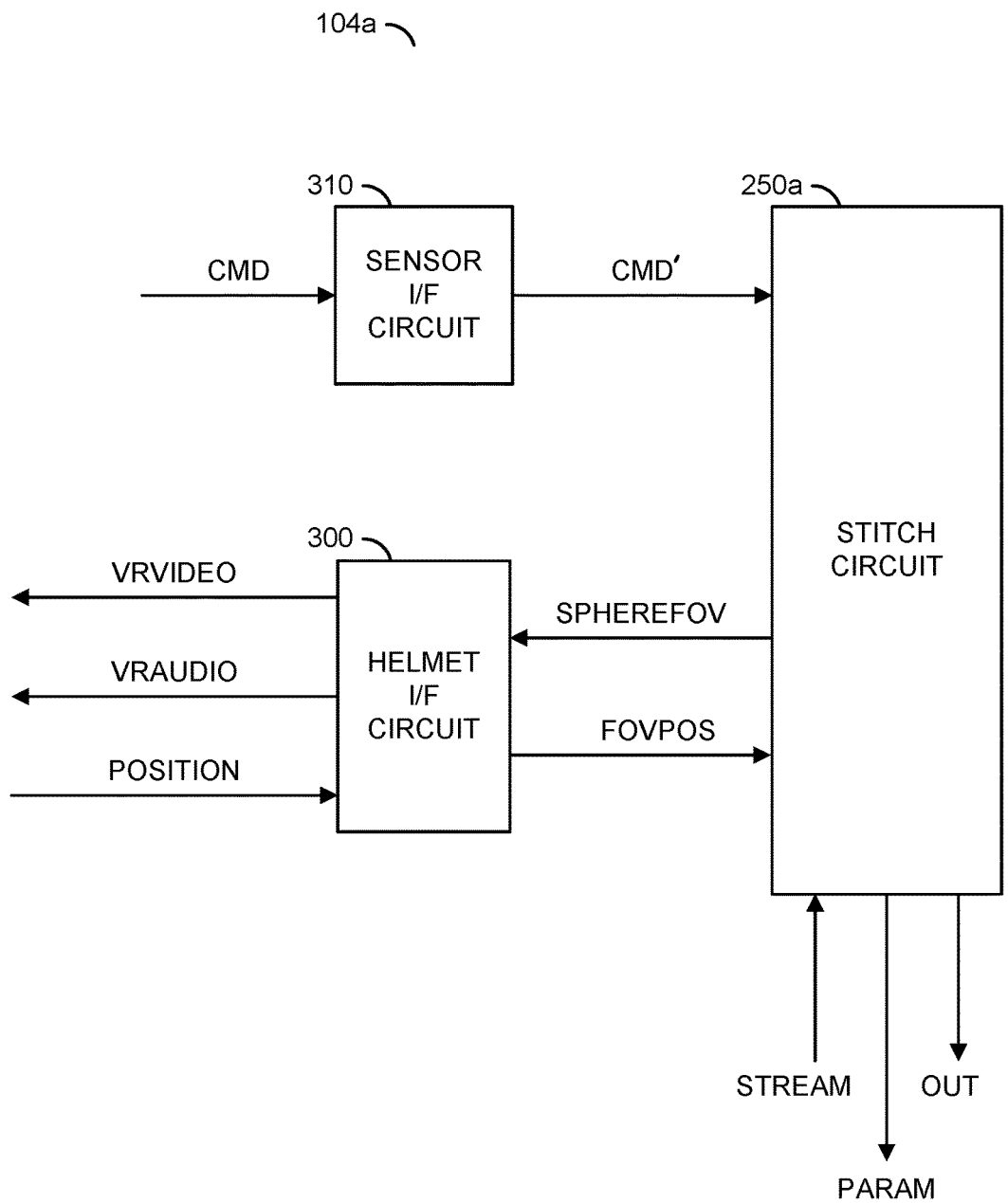
FIG. 2 is a block diagram of a processor circuit.

Referring to FIG. 2, a block diagram of an example implementation of a processor circuit 104a is shown. The circuit 104a may be an embodiment of the circuit 104. The circuit 104a generally comprises a block (or circuit) 250a, a block (or circuit) 300 and a block (or circuit) 310.

The signal CMD may be received by the circuit 310. A signal (e.g., CMD') may be generated by the circuit 310 and transferred to the circuit 250a. The signal CMD' may contain versions of the commands received in the signal CMD. The circuit 300 may generate the signals VRVIDEO and VRAUDIO. The signal POSITION may be received by the circuit 300. A signal (e.g., SPHEREFOV) may be generated by the circuit 250a and presented to the circuit 300. The signal SPHEREFOV may be an encoded video signal containing the stitched video streams and is representative of the spherical field of view and the audio content. In some embodiments, the signal SPHEREFOV may include on-screen display overlay information that is displayed to the user 90. A signal (e.g., FOVPOS) may be generated by the circuit 300 and transferred to the circuit 250a. The signal FOVPOS may include the position information received in the signal POSITION. The circuit 250a may receive the signal STREAM. The signal PARAM may be generated by the circuit 250a. The signal OUT may be generated by the circuit 250a. In various embodiments, the signal OUT may include all, some or none of the on-screen display overlay information that is present in the signal SPHEREFOV.

The circuit 250a may implement a stitch circuit (or external computing device). The circuit 250a is generally operational to stitch together the video content and/or audio content received in the signal STREAM to create the spherical field of view and corresponding audio in the signals SPHEREFOV and OUT. In various embodiments, the signals SPHEREFOV and OUT may contain monoscopic content so the user 90 sees the same content with each eye. In other embodiments, the signals SPHEREFOV and OUT may contain stereoscopic content so the user 90 sees a three-dimensional spherical field of view. The signals SPHERE- FOV and OUT may contain monophonic, stereophonic, quadrophonic, binaural, multichannel and/or three-dimensional audio content.

The circuit 250*a* may be operational to adjust the camera parameters in the signal PARAM based on the commands received in the signal CMD' and the position information received in the signal FOVPOS. Furthermore, the circuit 250*a* may be operational to adjust the stitching parameters of the transformations in the stitching operation based on the commands received in the signal CMD' and, in some situations, the position information received in the signal FOVPOS. Additional details of an example implementation of the circuit 250*a* may be found in co-pending U.S. application Ser. No. 14/982,236, filed Dec. 29, 2015, which is hereby incorporated by reference in its entirety.

The circuit 300 may implement a display interface circuit. The display interface circuit (or helmet interface circuit) 300 may be operational to generate the signals VRVIDEO and VRAUDIO from the signal SPHEREFOV based on the position information in the signal POSITION. As the location within the spherical field of view that the user 90 is looking at changes, the position information in the signal POSITION changes. In response to the changing position information, the circuit 300 may project a different portion of the visual content from the signal SPHEREFOV into the signal VRVIDEO. The circuit 300 may also adjust the audio content transformed from the signal SPHEREFOV into the signal VRAUDIO based on the position information to be consistent with the video content in the signal VRVIDEO. In some embodiments, the signals VRVIDEO, VRAUDIO and/or POSITION may be carried on wired and/or wireless connections.

The circuit 310 may implement a sensor interface circuit. The circuit 310 is generally operational to convert the electrical commands received in the signal CMD into a format suitable for the circuit 250*a*. The formatted commands may be transferred to the circuit 250*a* in the signal CMD'.

Figure 3:
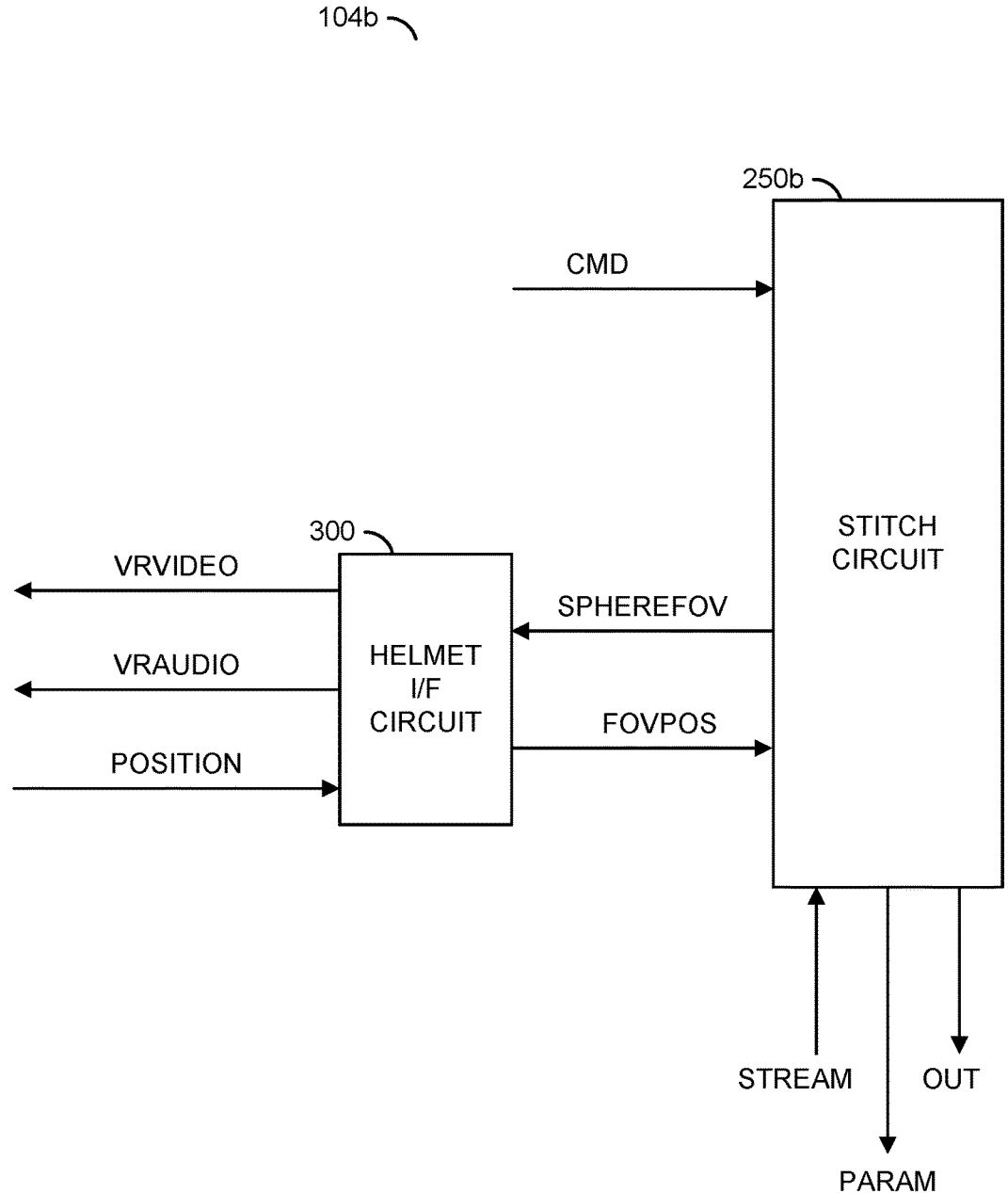
FIG. 3 is a block diagram of another configuration of the processor circuit.

Referring to FIG. 3, a block diagram of an example implementation of a processor circuit 104*b* is shown. The circuit 104*b* may be an embodiment of the circuit 104. The circuit 104*b* generally comprises a block (or circuit) 250*b* and the circuit 300.

The circuit 250*b* may implement a stitch circuit. The circuit 250*b* may be similar to the circuit 250*a* with the signal CMD being received directly by the circuit 250*b*. In some embodiments, the circuit 250*b* may incorporate the circuit 310 to accommodate the signal CMD. In other embodiments, the circuit 250*b* may be directly compatible with the signal CMD and so the circuit 310 may be eliminated.

Figure 4:
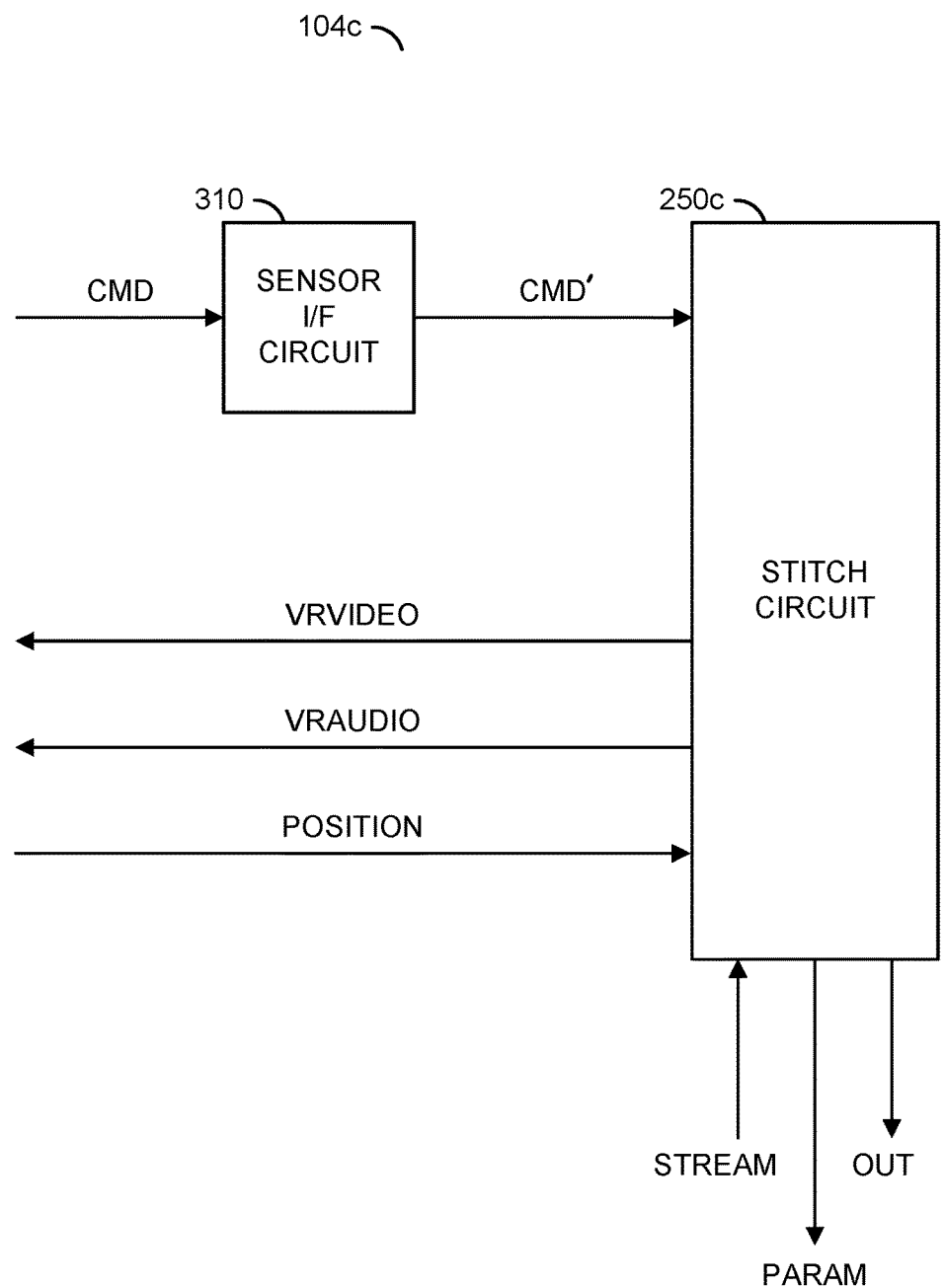
FIG. 4 is a block diagram of still another configuration of the processor circuit.

Referring to FIG. 4, a block diagram of an example implementation of a processor circuit 104*c* is shown. The circuit 104*c* may be an embodiment of the circuit 104. The circuit 104*c* generally comprises a block (or circuit) 250*c* and the circuit 310.

The circuit 250*c* may implement a stitch circuit. The circuit 250*c* may be similar to the circuit 250*a* with the signal POSITION being received directly by the circuit 250*c*. The circuit 250*c* may generate the signal VRVIDEO and VRAUDIO instead of the circuit 300. In some embodiments, the circuit 250*c* may incorporate the circuit 300. In other embodiments, the circuit 250*c* may be directly compatible with the signals VRVIDEO, VRAUDIO and POSITION and so the circuit 300 may be eliminated.

Figure 5:
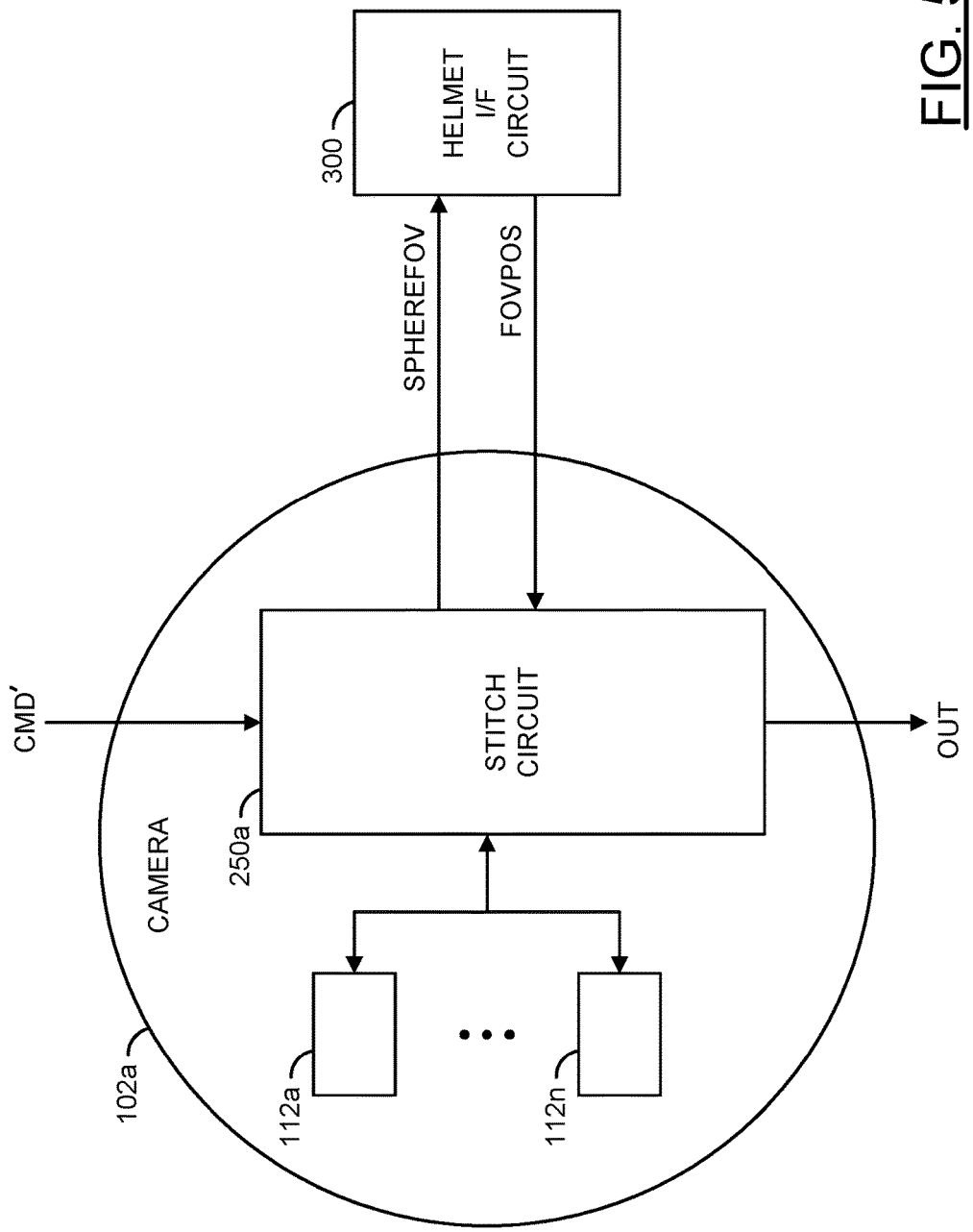
FIG. 5 is a block diagram of a camera.

Referring to FIG. 5, a block diagram of an example implementation of a camera 102*a* is shown. The camera (or live video source) 102*a* may be a variation of the camera 102 with additional embedded circuitry. The camera 102*a* generally comprises the circuit 250*a* and the capture devices, shown as blocks 112*a*-112*n*. Video signals from the capture devices 112*a*-112*n* may be presented to the circuit 250*a*. The parameters (or instructions) that control the capture devices 112*a*-112*n* may be presented from the circuit 250*a* to the capture devices 112*a*-112*n*. In some embodiments, the circuit 300 may be located outside the camera 102*a* (e.g., as a stand alone circuit, part of a computer or other mobile device, or integrated into the helmet 106). In other embodiments, the helmet circuit 300 may be integrated into the camera 102*a*.

Figure 6:
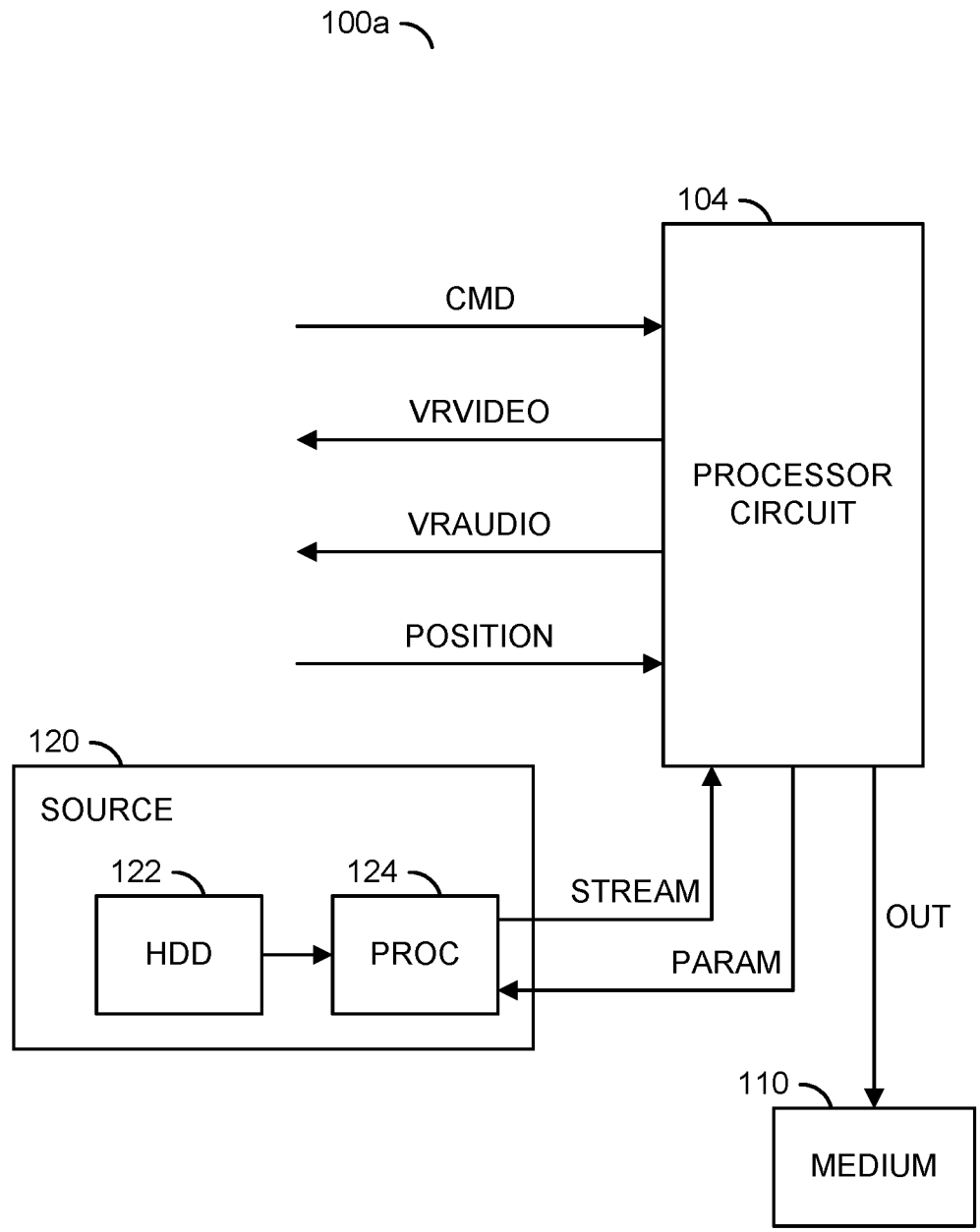
FIG. 6 is a block diagram of a modified system.

Referring to FIG. 6, a block diagram of an example implementation of a system 100*a* is shown. The system 100*a* may be a variation of the system 100 where the audio/video content in the signal STREAM is prerecorded material. The system 100*a* generally comprises the circuit 104, the medium 110 and a block (or circuit) 120. The circuit 120 may include a block (or circuit) 122 and a block (or circuit) 124. The signal STREAM may be generated by the circuit 124. The signal PARAM may be received by the circuit 124.

The circuit 120 may implement a content source (or recorded video source). The content source 120 may be operational to present video content and audio content in the signal STREAM. The content source 120 may also be operational to adjust the video content and the audio content in response to the parameters in the signal PARAM as if the content source 120 were a live camera (e.g., the camera 102).

The circuit 122 is shown as a storage medium. In various embodiments, the storage medium 122 may be implemented as one or more media or drives (e.g., hard disk drives, solid-state drive, optical drivers, tape drives, etc.). The storage medium 122 may store the prerecorded audio/video content of an environment. When commanded, the storage medium 122 may present the audio/video content to the circuit 124 as the individual video streams that represent the environment.

The circuit 124 may implement one or more processing circuits. The processing circuit 124 is generally operational to modify the audio/video content received from the storage medium 122 based on the parameters received from the circuit 104 in the signal PARAM. The modified audio/video content may be presented as the individual components in the signal STREAM. For example, the processing circuit 124 may darken the video image content in a selected video stream received from the storage medium 122 to emulate a reduction in a camera aperture. In another example, the processing circuit 124 may adjust a black level of the video image content in all of the video streams to emulate a similar black level adjustment in the camera.

The system 100*a* may be useful for off-line editing and/or post-production purposes. Live audio/video may be captured and stored in the storage medium 122. Later, the audio/video content may be played back through the circuit 104 and the helmet 106 to the user 90. The user 90 may adjust the parameters of the content source 120 and/or stitching operation to create a final spherical video that is stored and/or transmitted in the medium 110.

In a hybrid environment, part of the environment seen by the user 90 may be live and part may be prerecorded. The video streams from the capture devices 112*a*-112*n* may be mixed with the video streams from the storage medium 122 to form the signal STREAM. The parameter changes in the signal PARAM may be routed to the appropriate camera/source based on the video streams subject to the commands issued by the user 90.

Figure 7:
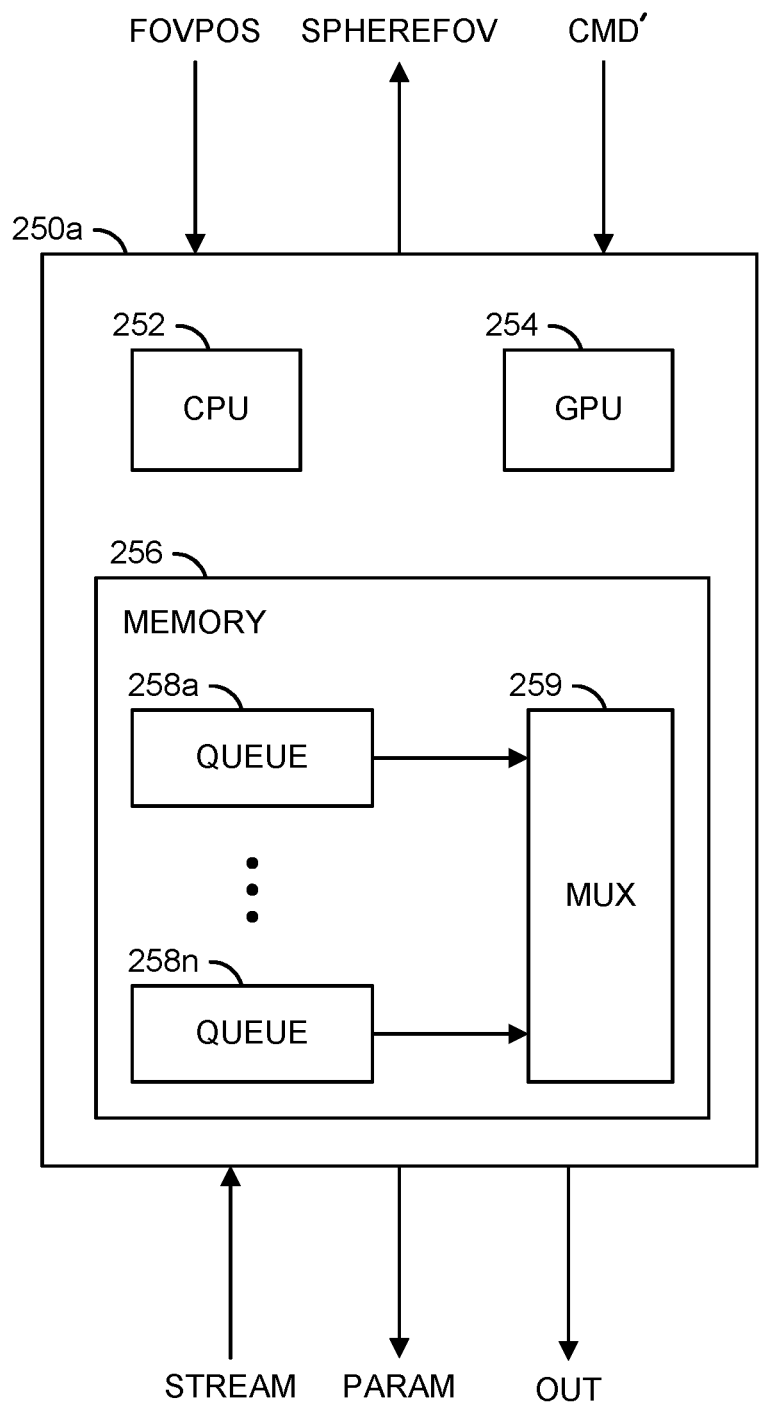
FIG. 7 is a diagram of a stitch circuit.

Referring to FIG. 7, a diagram of an example implementation of the circuit 250a is shown. Internal components of the circuit 250a generally comprise a block (or circuit) 252, a block (or circuit) 254 and a block (or circuit) 256. The circuit 252 may be a central processing unit (CPU). The circuit 254 may be a graphics processing unit (GPU). The circuit 256 may be a memory. The CPU 252 may be configured to implement general processing for the circuit 250a. The GPU 254 may be configured to perform particular graphics intensive calculations. The memory 256 may provide volatile and/or nonvolatile data storage.

The CPU 252 and/or the GPU 254 may be configured to transcode the signal STREAM to provide different resolutions and/or compression ratios (e.g., bitrates) for the output signals SPHEREFOV and OUT. The CPU 252 and/or the GPU 254 may be configured to switch from one resolution/bitrate to another resolution/bitrate on the fly. The operations performed by the CPU 252 and/or the GPU 254 may be varied according to the design criteria of a particular implementation.

The CPU 252 and/or the GPU 254 may also be configured to adjust stitching parameters of transformations in the stitching operation and/or send updated camera/source parameters (or instructions to update the parameters) to the camera 102/102a and/or the content source 120. The adjustments are generally based on commands initiated by the user 90 and received via the signal CMD'. In some situations, selection among the capture devices 112a-112n in the camera 102/102a, the video streams in the content source 120 and/or portions (or projection) of the spherical field of view being stitched together to which the commands are applied may be based on the position information received in the signal FOVPOS. In other situations, the commands may be applied globally to all of the capture devices 112a-112n/video streams (e.g., ISO settings) and/or all of spherical field of view (e.g., color corrections).

Generally, the CPU 252 may be implemented as a high-performance processor. The GPU 254 may be implemented as a high-performance (e.g., gaming-class) graphics processing unit. For example, conventional mobile-class processing units may not be powerful enough to perform the stitching operation, the transcoding operations and/or the parameter adjustment operations.

The memory 256 may be configured to receive the signal STREAM. For example, the memory 256 may buffer the incoming data packets in the signal STREAM. In some embodiments, the memory 256 may be used to synchronize the data packets in the signal STREAM. In some embodiments, the memory 256 may be used to store data packets of the signals SPHEREFOV and OUT. For example, after performing the stitching operation, the circuit 250a may be configured to encode the stitched content to create a file for storage in the memory 256. In some embodiments, the file may be transcoded into multiple bitstreams (e.g., high resolution bitstreams, low resolution bitstreams, etc.) and stored in the memory 256.

The memory 256 may comprise multiple blocks (or circuits) 258a-258n and/or a block (or circuit) 259. The circuits 258a-258n may implement queues. The circuit 259 may implement a multiplexer. In some embodiments, the video streams from the individual capture devices 112a-112n/content source 120 may not be synchronized before being transmitted to the circuit 250a. When the video streams are not synchronized before reaching the circuit 250a, the data packets of the signal STREAM may be buffered in the queues 258a-258n. The data packets may be interleaved to synchronize the video streams. The multiplexer 259 may be configured to receive the interleaved data packets from the queues 258a-258n. When the video streams are synchronized, the CPU 252 and/or the GPU 254 may efficiently perform the video stitching operation (e.g., generate the spherical field of view while reducing distortion).

Each of the capturing, encoding and transferring operations performed by the camera 102/102a and/or the content source 120, and each decoding, video stitching, transferring and parameter adjusting operations performed by the circuit 250a may be performed in real-time (or near real-time). For example, initial encoded video frames in the signal STREAM, may be transferred to the circuit 250a for the video stitching operation while the camera 102/102a receives new images and generates the next encoded video frames for the signal STREAM.

The circuit 250a may receive the video signals created from the capture devices 112a-112n and/or the content source 120 in the signal STREAM, perform the stitching operation and then re-encode the stitched video to create the signals SPHEREFOV and OUT. The circuit 250a may transfer the omnidirectional video signal SPHEREFOV to the circuit 300, and optionally, transfer the signal OUT to the medium 110 (e.g., a content distribution network). In some embodiments, the content distribution network may implement cloud processing (e.g., distributed processing configured to scale according to demand). The cloud processing may receive the signal OUT, transcode the signal OUT to multiple omnidirectional video streams (e.g., different resolutions, different compression ratios, different bitrates, etc.) then distribute the transcoded omnidirectional videos to various end users on demand.

Figure 8:
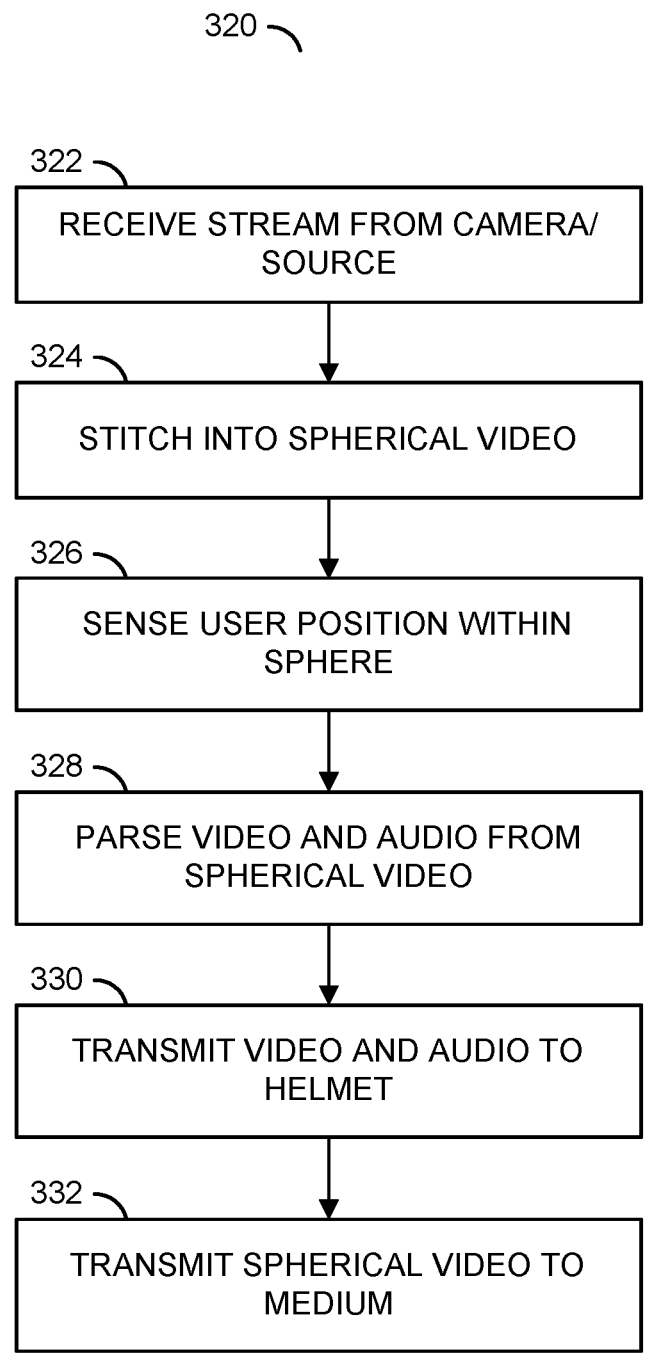
FIG. 8 is a flow diagram of a method of operation for the processor circuit.

Referring to FIG. 8, a flow diagram of an example method of operation of the circuit 104 is shown. The method (or process) 320 generally comprises a step (or state) 322, a step (or state) 324, a step (or state) 326, a step (or state) 328, a step (or state) 330 and a step (or state) 332. The steps 322-332 may be implemented in hardware, software executing on hardware, or a combination of hardware and software in the circuit 104.

In the step 322, the circuit 104 may receive the encoded video streams from the camera 102/102a and/or the content source 120 in the signal STREAM. The encoded video streams may be stitched together in the step 324 to form stitched spherical video and audio. In the step 326, the circuit 104 may receive the user position information in the signal POSITION. The circuit 104 generally parses (or projects) the video content and the audio content from the stitched spherical video and audio into the signals VRVIDEO and VRAUDIO. The signals VRVIDEO and VRAUDIO may be presented from the circuit 104 to the helmet (or display) 106 in the step 330. In the step 332, the stitched spherical video and audio may be presented in the signal OUT to the medium 110.

Figure 9:
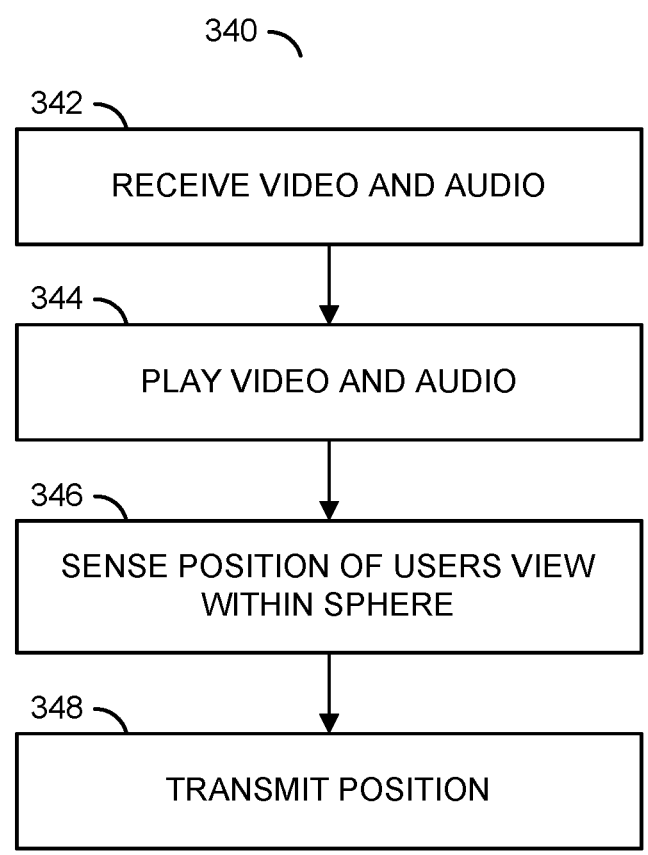
FIG. 9 is a flow diagram of a method of operation for a helmet.

Referring to FIG. 9, a flow diagram of an example method of operation of the helmet 106 is shown. The method (or process) 340 generally comprises a step (or state) 342, a step (or state) 344, a step (or state) 346 and a step (or state) 348. The steps 342-348 may be implemented in hardware, software executing on hardware, or a combination of hardware and software in the helmet 106.

In the step 342, the helmet 106 may receive the visual content and the audio content in the signals VRVIDEO and VRAUDIO. The video content and the audio content may be played to the user 90 in the step 344. While the user 90 is seeing/hearing the visual/audio content, the helmet 106 may sense the position in the spherical field of view where the user 90 is looking in th step 346. The position information may be presented in the signal POSITION to the circuit 104 in the step 348.

Figure 10:
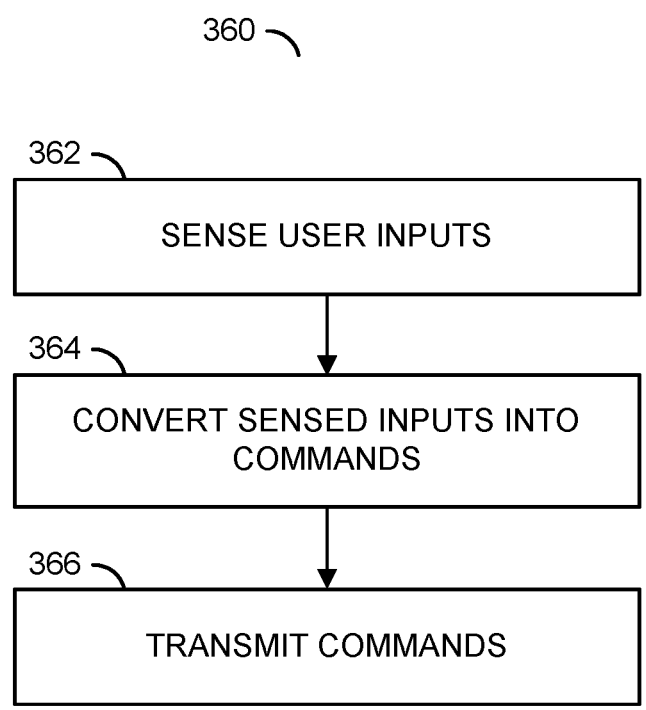
FIG. 10 is a flow diagram of a method of operation for sensors.

Referring to FIG. 10, a flow diagram of an example method of operation of the sensor 108 is shown. The method (or process) 360 generally comprises a step (or state) 362, a step (or state) 364 and a step (or state) 366. The steps 362-366 may be implemented in hardware, software executing on hardware, or a combination of hardware and software in the sensor 108.

In the step 362, the sensor 108 may sense, detect and/or receive input commands from the user 90. The commands may be physical (e.g., a hand motion command) and/or acoustic (e.g., a voice command). The sensors 108 may convert the sensed input commands into electrical commands in the step 364. The electrical commands may be transferred in the step 366 to the circuit 104 via the signal CMD.

Figure 11:
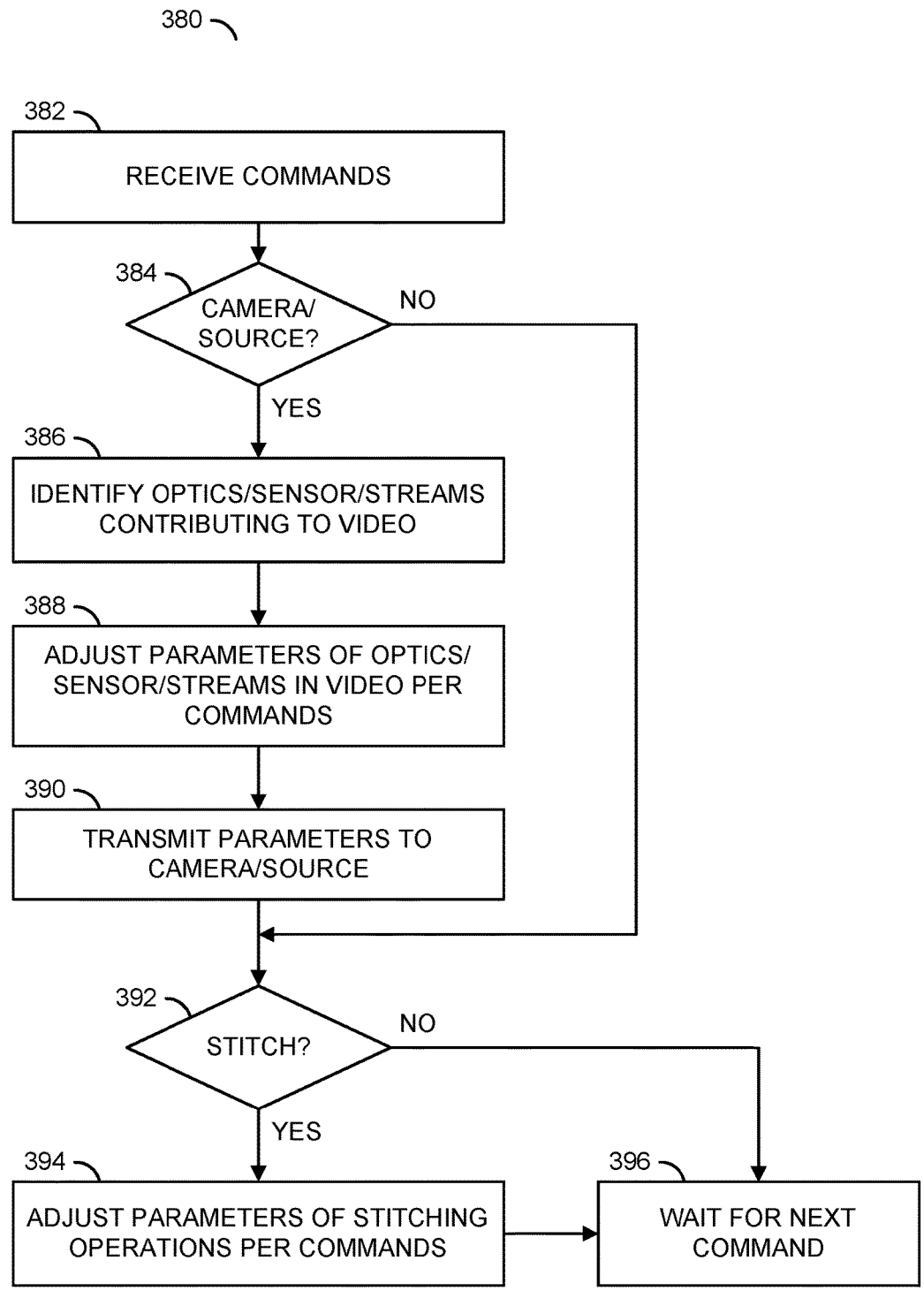
FIG. 11 is a flow diagram of a method for changing parameters.

Referring to FIG. 11, a flow diagram of an example method for changing parameters with a stitch circuit 250 is shown. The circuit 250 may be representative of the circuits 250a-250c. The method (or process) 380 generally comprises a step (or state) 382, a decision step (or state) 384, a step (or state) 386, a step (or state) 388, a step (or state) 390, a decision step (or state) 392, a step (or state) 394 and a step (or state) 396. The steps 382-396 may be implemented in hardware, software executing on hardware, or a combination of hardware and software in the circuit 250.

The circuit 250 may receive one or more commands from the user 90 via the signal CMD' or the signal CMD in the step 382. A nature of the individual commands may be examined. Various commands may result in changes to one or more camera/source parameters, changes to one or more stitching parameters, or changes to both camera/source parameters and stitching parameters.

If a particular command is intended to change one or more camera/source parameters, the decision step 384 may continue with the step 386. In the step 386, if the particular command is not a global adjustment, the circuit 250 may identify one or several of the capture devices 112a-112n of the camera 102/102a and/or the video streams from the storage medium 122 of the content source 120 that are contributing to the visual content being observed by the user 90. The visual content may be identified based on the position information received in the signal FOVPOS or the signal POSITION relative to the spherical field of view created by the circuit 250.

If the particular command is a global adjustment, the circuit 250 may identify all the capture devices 112a-112n of the camera 102/102a and/or all of the video streams from the storage medium 122 of the content source 120 to apply the adjustments. Once the capture devices 112a-112n/video streams are identified, the circuit 250 may send one or more updated camera/source parameters (or instructions to update the parameters) in the step 388 to the camera 102/102a and/or the content source 120. In some embodiments, for example, the circuit 250 may send an exposure time to be used by a capture device 112n in the camera 102a. In another example, the circuit 250 may send a command to increase a current exposure time used by the capture device 112a by 10 percent. Other parameter-changing protocols may be implemented between the circuit 250 and the camera 102/102a and/or the content source 120 to meet the design criteria of a particular application. The camera parameters/instructions may be transmitted in the signal PARAM from the circuit 250 to the camera 102/102a and/or the content source 120 in the step 390.

Returning to the decision step 384, if the particular command is not intended to change any camera/source parameters, the decision step 384 may continue with the step 392. If the particular command is intended to change one or more of the stitching parameters in the stitching operation, the step 392 may continue with the step 394. If no stitching parameters are being adjusted, the step 392 may continue with the step 396 where the circuit 250 waits for a next command. In the step 394, the circuit 250 may adjust the stitching parameters of the transformations in the stitching operation associated with the particular command. The adjustments may be made to the local area of interest in the spherical field of view or globally to the entire spherical field of view, based on the type of commands received. For example, the user 90 may issue a localized command to darken a limited portion of the spherical field of view containing a bright light source (e.g., the sun). In another example, the user 90 may issue a global command to change a stitching parameter that controls how all overlapping views in the spherical field of view are blended. After the adjustments to the stitching operation have been made, the circuit 250 may wait for the next command in the step 396.

Figure 12:
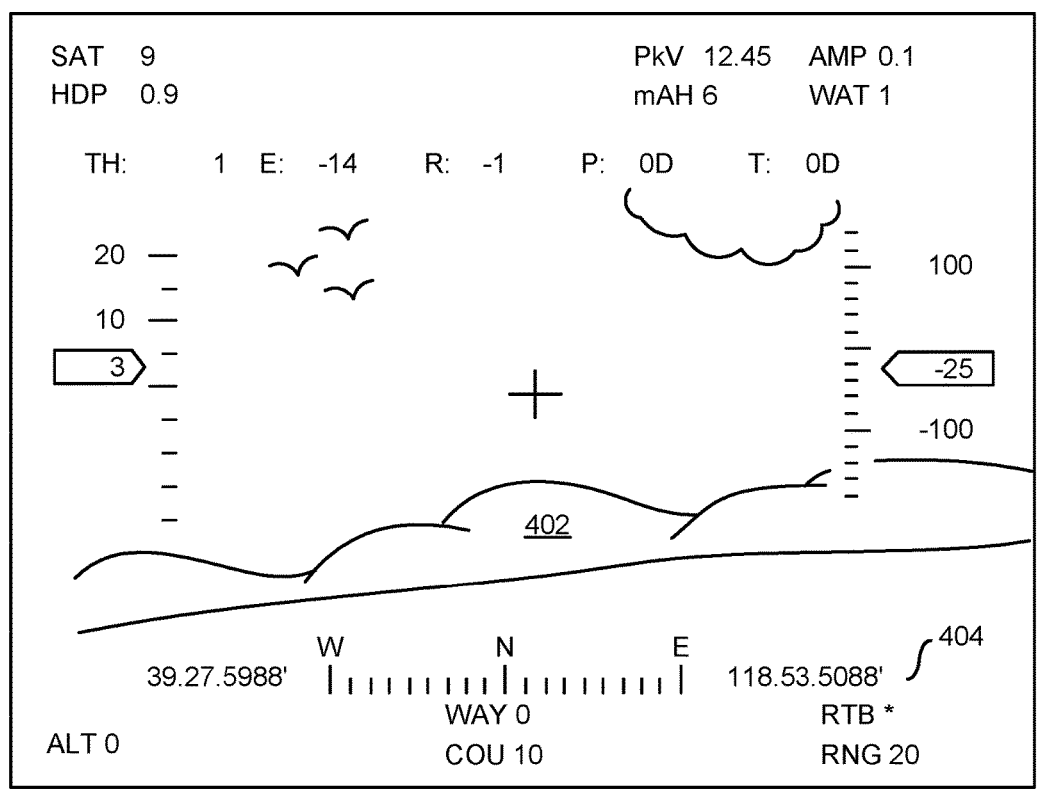
FIG. 12 is a diagram of a view showing an outdoor scene.

Referring to FIG. 12, a diagram of an example view 400 is shown. The view 400 may show an outdoor scene 402 to the user 90 while wearing (or using) the helmet 106. An on-screen display (OSD) overlay 404 may be superimposed over the scene 402 captured by the camera 102/102a and/or stored in the content source 120. The on-screen display 402 may contain one or more information elements (e.g., altitude, range, etc.) and/or one or more control elements (e.g., buttons, slides, mouse cursors, pointers, etc.). The control elements shown in the OSD overlay 404 may be selectable and adjustable by the user 90. For example, slidable/rotatable controls may be moved and buttons may be activated. The user 90 may manipulate the control elements in the OSD overlay 404 using speech recognition and/or physical controls (e.g., a joystick) accessible to the user 90. In some embodiments, the information elements and/or control elements in of the OSD overlay 404 may remain always visible in a fixed position relative to the user 90 no matter how the user 90 moves his/her head. In other embodiments, some of the information elements and/or control elements in the OSD overlay 404 may be fixed relative to the spherical view. For example, buttons related to the camera 102/102a may remain attached to and/or near a projection of the camera 102/102a in the spherical view. Mixtures of fixed-location and variable location information elements and/or control elements may be included in some spherical views. In various embodiments, the OSD overlay 404 may be complemented by voice-over narration or description.

Figure 13:
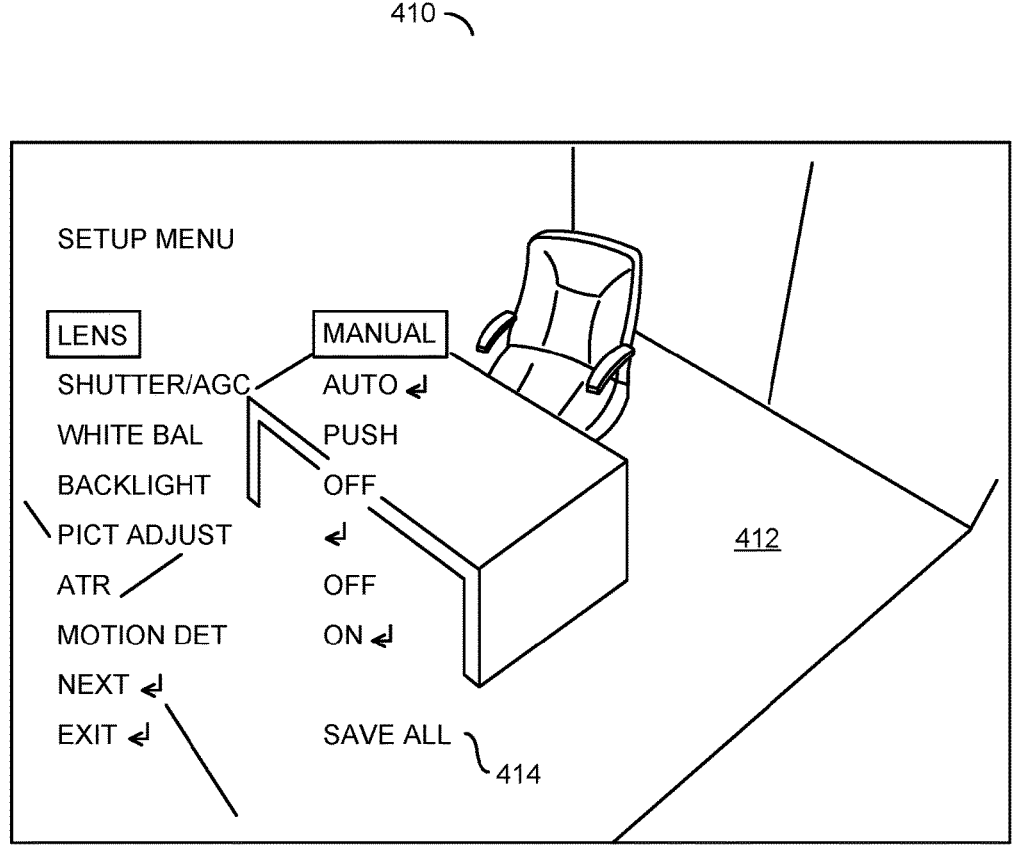
FIG. 13 is a diagram of a view showing an indoor scene.

Referring to FIG. 13, a diagram of another example view 410 is shown. The view 410 may show an indoor scene 412 to the user 90 while wearing (or using) the helmet 106. An OSD overlay 414 may be superimposed over the scene 412 captured by the camera 102/102a or stored in the content source 120. In the example, several camera/source parameters (e.g., shutter/automatic gain control, white balance, backlight, etc.) may be illustrated. The user 90 generally adjusts the camera/source parameters by moving cursors up and down through the lists of lens related parameters and manual control related parameters. In various embodiments, a multi-level menu structure may be presented to the user 90.

Figure 14:
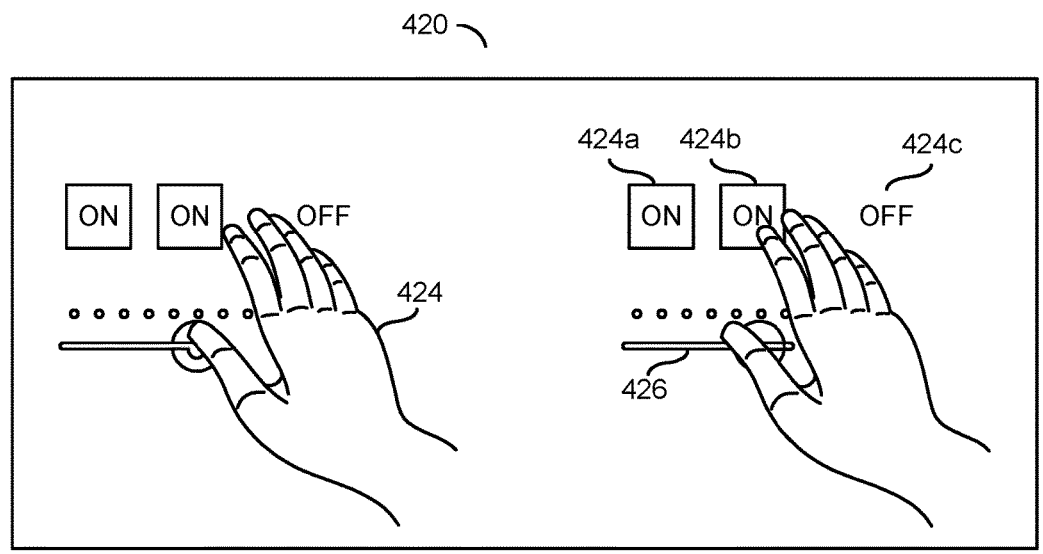
FIG. 14 is a diagram of a view showing a stereoscopic set of virtual controls.

Referring to FIG. 14, a diagram of an example view 420 is shown. The view 420 may show a stereoscopic set of virtual controls and a virtual hand 422 to the user 90. The virtual controls generally comprise a set of buttons 424a-424c and a virtual slide 426. The virtual hand 422 may be controlled by the user 90 holding a virtual reality hand gesture tool. The hand gesture tool may communicate directly with the circuit 250 or through the sensor circuit 108.

Figure 15:
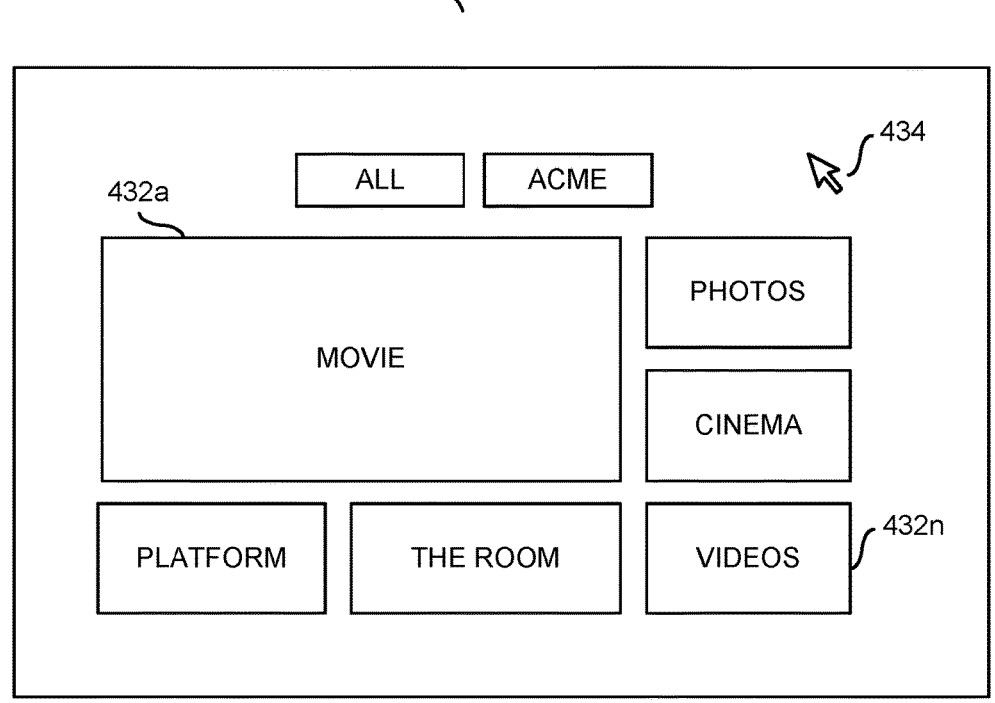
FIG. 15 is a diagram of a view showing a set of buttons and a cursor.

Referring to FIG. 15, a diagram of an example view 430 is shown. The view 430 may show a set of buttons 432a-432n and a cursor 434 to the user 90. The buttons 432a-432n may be filled with static (e.g., title) and/or dynamic content (e.g., a thumbnail-size movie clip). The user 90 may select one of the buttons 432a-432n by moving the cursor 434 over the button with a joystick. A switch on the joystick generally allows the user 90 to select a particular button 432a-432n that the cursor 434 is over.

Various embodiments of the system 100 may enable the user 90 to change different settings of the video and/or audio, directly within an immersive environment. The immersive environment is generally the same as what other end users will experience. Through a viewer in the helmet (or display) 106, based on user interactions, the user 90 may communicate with the camera 102/102a, the content source 120 and/or circuit 104 to change settings of the capture devices and/or the stitching operation.

The settings for the circuit 104 may include, but are not limited to: geometrically based (e.g., calibration, stitching distance, parallax, lens distortion, and orientation of the spherical video); baseline distance between views for stereoscopic video; user, network settings and/or connection related settings (e.g., settings of a real time messaging protocol (RTMP)/content delivery network (CDN) server, and user accounts); artistically based settings; social networking type filters; authoring tool for advertisement and/or live story telling; insertion of hot spots/action-triggering areas; and audio settings (e.g., global audio volume, volume of sound objects, and location of sound objects).

The settings for the camera 102/102a and/or the content source 120 may include, but are not limited to: photometric based (e.g., ISO sensitivity, exposure, white balance, contrast curve, black and white level, and tone mapping). The settings applicable to one or more of the circuit 104, the camera 102/102a and/or the content source 120 may include, but are not limited to: exposure; white balance; contrast curve; black level; white level; and tone mapping. In various embodiments, the settings may be applied in the circuit 104 either globally to all capture devices, or individually to some capture devices as part of post-processing operations of the incoming video streams.

The functions and structures illustrated in the diagrams of FIGS. 1 to 15 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element. As used herein, the term "simultaneously" is meant to describe events that share some common time period but the term is not meant to be limited to events that begin at the same point in time, end at the same point in time, or have the same duration.

While the invention has been particularly shown and described with reference to embodiments thereof, it will be understood by those skilled in the art that various changes in form and details may be made without departing from the scope of the invention.

The invention claimed is:

1. A system comprising:
a video source configured to generate a plurality of video streams that capture a view of an environment; and
a computing device comprising one or more processors configured to (i) perform a stitching operation on said plurality of video streams to generate a video signal representative of a spherical field of view of said environment, (ii) transmit a display signal that represents a projection of said video signal to be displayed to a user utilizing an immersive display, (iii) receive a plurality of commands from said user while said user observes said environment in said immersive display and (iv) adjust a plurality of parameters in one or more of said video source and said stitching operation in real time in response to said commands.

2. The system according to claim 1, wherein said video source comprises a camera (i) surrounded by said environment, (ii) configured to generate said plurality of video streams and (iii) configured to adjust one or more of said plurality of video streams in response to said parameters.

3. The system according to claim 1, wherein said video source comprises (i) one or more storage media configured to present said plurality of video streams and (ii) a processing circuit configured to adjust one or more of said plurality of video streams in response to said parameters.

4. The system according to claim 1, wherein said computing device is further configured to (i) receive a position signal that identifies where said user is currently observing in said spherical field of view and (ii) generate said display signal in response to said position signal.

5. The system according to claim 4, wherein said immersive display is configured to (i) generate said position signal and (ii) display said display signal to said user.

6. The system according to claim 1, wherein (i) said computing device is further configured to identify one or more of said plurality of video streams that contribute to said display signal when said commands related to said video source are received from said user and (ii) transfer said parameters to said video source to adjust said one or more video streams that are identified.

7. The system according to claim 1, wherein said computing device is further configured to (i) identify one or more of a plurality of transformations in said stitching operation that contribute to said display signal when said commands related to said stitching operation are received from said user and (ii) change said one or more transformations in response to said commands.

8. The system according to claim 1, wherein said computing device further comprises a sensor interface circuit configured to (i) receive said commands from said user and (ii) generate one or more electrical signals representative of said commands.

9. The system according to claim 8, wherein said computing device further comprises a stitch circuit configured to (i) perform said stitching operation to generate said video signal and (ii) instruct said one or more of said video source and said stitching operation to adjust said parameters in response to said electrical signals received from said sensor interface circuit.

10. The system according to claim 1, further comprising a display interface circuit configured to (i) generate said display signal from said video signal based on a position signal that identifies where said user is currently observing in said spherical field of view and (ii) generate one or more electrical signals representative of said position.

11. The system according to claim 10, wherein said computing device further comprises a stitch circuit configured to (i) perform said stitching operation to generate said video signal and (ii) identify one or more of said plurality of video streams that contribute to said display signal in response to said electrical signals received from said display interface circuit.

12. A method for immersive changes to a spherical field of view, comprising the steps of:
(A) generating a plurality of video streams that capture a view of an environment using a video source;
(B) performing a stitching operation on said plurality of video streams to generate a video signal representative of said spherical field of view of said environment;
(C) transmitting a display signal that represents a projection of said video signal to be displayed to a user utilizing an immersive display;
(D) receiving a plurality of commands from said user while said user observes said environment in said immersive display; and
(E) adjusting a plurality of parameters in one or more of said video source and said stitching operation in real time in response to said commands.

13. A system comprising:
an immersive display configured to display to a user a projection of a spherical field of view representative of an environment; and
a plurality of sensors configured to receive a plurality of commands from said user while said user observes said environment using said immersive display, wherein (i) a plurality of parameters in one or more of a video source and a stitching operation are adjusted in response to said commands, (ii) said user sees changes in real time to said environment through said immersive display in response to said commands and (iii) said stitching operation generates a video signal representative of said environment from a plurality of video streams generated by said video source.

14. The system according to claim 13, wherein (i) said immersive display is further configured to generate a position signal that identifies said projection of said spherical field of view currently observed by said user and (ii) said position signal conveys one or more of (a) a head orientation of said user relative to said spherical field of view and (b) an eye position said user relative to said spherical field of view.

15. The system according to claim 13, wherein said immersive display is further configured to play audio to said user as presented by said video source.

16. The system according to claim 13, wherein said sensors comprise one or more of (i) an eye tracking sensor, (ii) a hand gesture sensor, (iii) a tracking pad sensor, (iv) a rotating platform angle sensor, (v) a game pad sensor, (vi) a computer mouse and (vii) a speech recognition circuit.

17. The system according to claim 13, wherein said sensors control one or more of (i) an authoring tool, (ii) an insertion of one or more hot spot areas and (iii) an insertion of one or more action-triggering areas.

18. The system according to claim 13, wherein said parameters relate to one or more of (i) calibration, (ii) stitching distance, (iii) parallax, (iv) lens distortion, (v) spatial orientation of said video source, (vi) light sensitivity, (vii) exposure, (viii) white balance, (ix) contrast curve, (x) black level, (xi) white level, (xii) tone mapping, (xiii) focal length, (xiv) baseline distance between views, (xv) network settings, (xvi) filters, (xvii) global audio volume, (xviii) audio volume of a sound object and (ixx) a location of said sound object.

19. The system according to claim 13, further comprising a computing device comprising one or more processors configured to (i) perform said stitching operation on said plurality of video streams to generate said video signal representative of said spherical field of view of said environment, (ii) transmit a display signal that represents a projection of said video signal to be displayed to said user utilizing said immersive display, (iii) receive said plurality of commands from said user via said sensors while said user observes said environment in said immersive display and (iv) adjust said plurality of parameters in one or more of said video source and said stitching operation in real time in response to said commands.

20. The system according to claim 19, wherein said computing device comprises (i) a stitch circuit configured to generate said video signal, (ii) a display interface circuit configured to generate said display signal from said video signal and (iii) a sensor interface circuit configured to receive said commands from said user.

* * * * *